(12) United States Patent
Maeda et al.

(10) Patent No.: US 8,603,339 B2
(45) Date of Patent: Dec. 10, 2013

(54) ACTIVATED SLUDGE MATERIAL, METHOD FOR REDUCING EXCESS SLUDGE PRODUCTION IN BIOREACTOR, AND METHOD OF CONTROLLING BIOREACTOR

(75) Inventors: Katsuhiko Maeda, Toyama (JP); Minoru Okamoto, Toyama (JP)

(73) Assignee: Diamond Engineering Co., Ltd., Tokyo (JP)

( * ) Notice: Subject to any disclaimer, the term of this patent is extended or adjusted under 35 U.S.C. 154(b) by 881 days.

(21) Appl. No.: 12/675,600

(22) PCT Filed: Aug. 26, 2008

(86) PCT No.: PCT/JP2008/065153
§ 371 (c)(1),
(2), (4) Date: Feb. 26, 2010

(87) PCT Pub. No.: WO2009/028481
PCT Pub. Date: Mar. 5, 2009

(65) Prior Publication Data
US 2010/0206808 A1    Aug. 19, 2010

(30) Foreign Application Priority Data

Aug. 28, 2007 (JP) ............................... 2007-221675
Aug. 28, 2007 (JP) ............................... 2007-221676
Jun. 6, 2008 (JP) ............................... 2008-149792
Jun. 6, 2008 (JP) ............................... 2008-149793

(51) Int. Cl.
*C02F 3/00* (2006.01)
(52) U.S. Cl.
USPC ........................ 210/606; 435/262.5; 435/187

(58) Field of Classification Search
USPC ................................ 435/262.5, 187; 210/606
See application file for complete search history.

(56) References Cited

U.S. PATENT DOCUMENTS

| 5,464,766 A | * | 11/1995 | Bruno ........................... 435/187 |
| 6,083,395 A | | 7/2000 | Katsura et al. |
| 6,146,521 A | | 11/2000 | Yasui |
| 8,080,404 B1 | * | 12/2011 | Turetsky et al. ........... 435/262.5 |
| 2001/0000008 A1 | | 3/2001 | Hasegawa et al. |

FOREIGN PATENT DOCUMENTS

| DE | 102004042690 | 3/2006 |
| GB | 1283958 | 8/1972 |
| JP | 61141880 | 6/1986 |
| JP | 63-116800 | 5/1988 |

(Continued)

OTHER PUBLICATIONS

Extended European Search Report dated May 3, 2012, Application No. 08792711.7.

(Continued)

*Primary Examiner* — Chester Barry
(74) *Attorney, Agent, or Firm* — Young & Thompson

(57) ABSTRACT

Excess sludge production in a bioreactor of a wastewater treatment plant in which excess sludge is being produced is reduced by adding an activated sludge material having a chitinase specific activity of at least 150 Units/g-MLSS and a pectinase specific activity of at least 120 Units/g-MLSS to the bioreactor. After the addition of the activated sludge material, the bioreactor is controlled by adding the activated sludge material when any one of the chitinase activity, the pectinase activity, and the protease specific of the sludge in the bioreactor drops below the lower limits of 50 Units/L, 40 Units/L, and 0.3 Units/L, respectively.

9 Claims, 3 Drawing Sheets

(56) References Cited

FOREIGN PATENT DOCUMENTS

| | | |
|---|---|---|
| JP | 8-309382 | 11/1996 |
| JP | 09-000245 | 1/1997 |
| JP | 09-234060 | 9/1997 |
| JP | 09-234497 | 9/1997 |
| JP | 09-276895 | 10/1997 |
| JP | 10-263569 | 10/1998 |
| JP | 10-277587 | 10/1998 |
| JP | 10-305291 | 11/1998 |
| JP | 10-337593 | 12/1998 |
| JP | 11-057762 | 3/1999 |
| JP | 11-090496 | 4/1999 |
| JP | 11-300393 | 11/1999 |
| JP | 2000-24690 | 1/2000 |
| JP | 2000-167597 | 6/2000 |
| JP | 2000-325983 | 11/2000 |
| JP | 2001-70993 | 3/2001 |
| JP | 2001-212599 | 8/2001 |
| JP | 2001-259678 | 9/2001 |
| JP | 2001-314887 | 11/2001 |
| JP | 2001-327998 | 11/2001 |
| JP | 2002-361281 | 12/2002 |
| JP | 2003-010890 | 1/2003 |
| JP | 2003-200198 | 7/2003 |
| JP | 2003-219864 | 8/2003 |
| JP | 2004-41925 | 2/2004 |
| JP | 2004-275960 | 10/2004 |
| JP | 2006-55737 | 3/2006 |
| JP | 3844771 | 11/2006 |
| JP | 2007-21431 | 2/2007 |
| TW | 201006786 | 2/2010 |
| WO | WO 96/04370 | 2/1996 |
| WO | WO 00/43489 | 7/2000 |
| WO | 01/23534 | 4/2001 |

OTHER PUBLICATIONS

Susumu Hasegawa, "Dai 8 Ko Konetsusei Saikin o Riyo shita Yojo Odei Genryoka Gitjutsu no Kaihatsu Jireu", Odei no Genryoka to Hassei Boshi Gijutsu, 1st edition, Kabushiki Kaisha NTS, Nov. 6, 2000, pp. 251 to 262.

International Search Report, PCT/JP2008/065153, Oct. 7, 2008.

* cited by examiner

ACTIVATED SLUDGE MATERIAL, METHOD FOR REDUCING EXCESS SLUDGE PRODUCTION IN BIOREACTOR, AND METHOD OF CONTROLLING BIOREACTOR

TECHNICAL FIELD

This invention relates to activated sludge material and a method of reducing excess sludge production in a bioreactor of a wastewater treatment plant using organisms.

The invention also relates to a method for efficiently controlling a bioreactor of a wastewater treatment plant using organisms to prevent production of large quantities of excess sludge.

BACKGROUND ART

Wastewater containing organic substances are generally treated by a treatment system using organisms (bacteria). The treatment system using organisms produce a large quantity of excess sludge. In pursuit of realizing a recycle-based society, waste reduction and recycling has been promoted in Japan. The proportion of organic and inorganic sludge in the waste is high, and about 70% of the sludge is organic. Although recycling of organic sludge as, e.g., compost has come to be studied in public sludge treatment facilities or big business establishments, very little is recycled in small scale facilities. Since space is running out in waste landfills and finding a site for a new waste landfill is difficult, the cost of sludge treatment has been increasing year by year. It has therefore been demanded to develop a wastewater treatment system for reducing sludge production conveniently and economically.

In the light of the above circumstances, wastewater treatment facilities have proposed techniques for controlling or reducing sludge production. The proposals so far made typically include biological processes in which flocs of organisms are added to a bioreactor and processes in which part of produced sludge is solubilized by a physicochemical method, and the resulting solution is returned to a bioreactor to be treated biologically. The former processes have been empirically embodied making use of assimilation and secreted enzymes of *Bacillus subtilis* or photosynthetic bacteria. Recently proposed techniques belonging to the former processes include a sludge reduction technique using flocs of microorganisms obtained from piggery waste treatment as disclosed in patent document 1 (see below) and a sludge reduction system using thermophilic bacteria as disclosed in patent document 2 (see below). The methods for solubilizing the sludge used in the latter processes include those in which the cells of organisms in the sludge are physicochemically destroyed by milling (see patent documents 3 to 5 shown below), ozonization (see patent documents 6 to 9 shown below), ultrasonication (see patent documents 10 and 11 shown below), or water jetting (see patent documents 12 to 14 shown below).

Although these techniques are designed to achieve 10% to 20% reduction of sludge production compared with conventional technology, they have been put to little practical use for the following reasons. In the case of the biological processes, there is a problem that adding sludge-reducing bacteria into a bioreactor of a wastewater treatment plant brings about little change of the bacterial biota in the bioreactor or, even when the addition is continuous, the added bacteria do not predominate in the bacterial biota. Because of this problem, actual effects are uncertain. Moreover, reduction of solid matter typically including cellulose (e.g., paper) is difficult due to difficulty in decomposing in a bioreactor.

On the other hand, the techniques using a physicochemical process, such as milling, ozonization, or ultrasonication, involve an economical problem in practice because of general expensiveness of equipment. The milling method in which sludge is solubilized by the friction with beads, while providing high efficiency of finely comminuting the sludge in slurry, achieves only a low rate of solubilization and also has the problem that the scale of equipment is not easy to increase. The ozonization treatment, which belongs to accelerated oxidation processes, is high benefit not only because of ease and convenience of operation but also because of its ability to decompose persistent substances simultaneously. However, an ozone generator is expensive, and equipment for waste ozone disposal is separately required. The ultrasonication treatment attains a high rate of comminution and a high rate of solubilization but uses very expensive equipment and also needs a countermeasure against heat and noise generated by ultrasonication. In the water jet process, a sludge slurry is pressurized and jetted through nozzles into water to destroy the sludge by the cavitation caused by the difference in pressure. The water jet process shows high ability to finely comminuting a sludge slurry but requires a high power pump to comminute sludge effectively because the rate of sludge solubilization depends on the amount of cavitation generated.

Hence, the conventional techniques for controlling or reducing sludge production has their respective merits and demerits. A breakthrough in technology has thus been awaited.

In the light of the these circumstances, Applicant of the present invention previously proposed a process for reducing sludge production having high suppressive effect on sludge production and introducible into an existing wastewater treatment plant at low cost. The process is characterized by adding, to a system containing first activated sludge producing excess sludge, second activated sludge having a higher rate of autolysis than the first activated sludge (see patent document 15 shown below). This sludge reduction process was unsuitable for efficiently controlling a bioreactor of a wastewater treatment plant.

Patent document 1: JP 9-245A
Patent document 2: JP 9-234060A
Patent document 3: JP 11-300393A
Patent document 4: JP 2000-167597A
Patent document 5: JP 2000-325983A
Patent document 6: JP 9-234497A
Patent document 7: JP 11-90496A
Patent document 8: JP 2001-259678A
Patent document 9: JP 2001-327998A
Patent document 10: JP 2002-361281A
Patent document 11: JP 2003-200198A
Patent document 12: JP 2001-212599A
Patent document 13: JP 2001-314887A
Patent document 14: JP 2003-10890A
Patent document 15: Japanese Patent 3844771

DISCLOSURE OF THE INVENTION

An object of the invention is to provide a method for reducing sludge production having high suppressive effect on sludge production in a bioreactor of a wastewater treatment plant using organisms and introducible into an existing wastewater treatment plant at low cost.

Another object of the invention is to provide a method for efficiently controlling a bioreactor of a wastewater treatment plant using organisms without producing large quantities of excess sludge, the method exerting high suppressive effect on sludge production and being introducible into an existing wastewater treatment plant at low cost.

In extensive studies to accomplish the above objects, the present inventors noted specific activities of enzymes in a bioreactor. Further research has led to the discovery that specific activities of specific enzymes in a bioreactor are stabilized by adding an activated sludge material containing specific enzymes having respective specific activities in respective specific ranges to the bioreactor whereby the suppressive effect on excess sludge production lasts long.

The inventors have also found that the suppressive effect on excess sludge production is sustained by controlling a bioreactor so that the specific activities of specific enzymes may not drop below the respective lower limits.

Based on the above findings, the invention provides a method for reducing excess sludge production a bioreactor of a wastewater treatment plant in which sludge is being produced. The method includes adding any one of activated sludge materials (1) to (4) below to the bioreactor.

The invention also provides activated sludge materials (1) to (4) below for use in the above-described method for reducing excess sludge production in a bioreactor.
(1) An activated sludge material having a chitinase specific activity of at least 150 Units/g-MLSS and a pectinase specific activity of at least 120 Units/g-MLSS.
(2) An activated sludge material having a chitinase specific activity of at least 150 Units/g-MLSS, a pectinase specific activity of at least 120 Units/g-MLSS, and a protease specific activity of at least 3 Units/g-MLSS.
(3) An activated sludge material having a chitinase specific activity of at least 150 Units/g-MLSS, a pectinase specific activity of at least 120 Units/g-MLSS, and a cellulase activity of at least 100 Units/L.
(4) An activated sludge material having a chitinase specific activity of at least 150 Units/g-MLSS, a pectinase specific activity of at least 120 Units/g-MLSS, a protease specific activity of at least 3 Units/g-MLSS, and a cellulase activity of at least 100 Units/L.

The invention also provides a method for controlling a bioreactor of a wastewater treatment plant using organisms. The method includes adding any of the activated sludge materials (1) to (4) to the bioreactor at the time when any one of the chitinase activity, the pectinase activity, and the protease activity in the bioreactor drops below the following respective lower limits: a chitinase activity of 50 Units/L; a pectinase activity of 40 Units/L; and a protease activity of 0.3 Units/L.

BEST MODE FOR CARRYING OUT THE INVENTION

Figure 1:
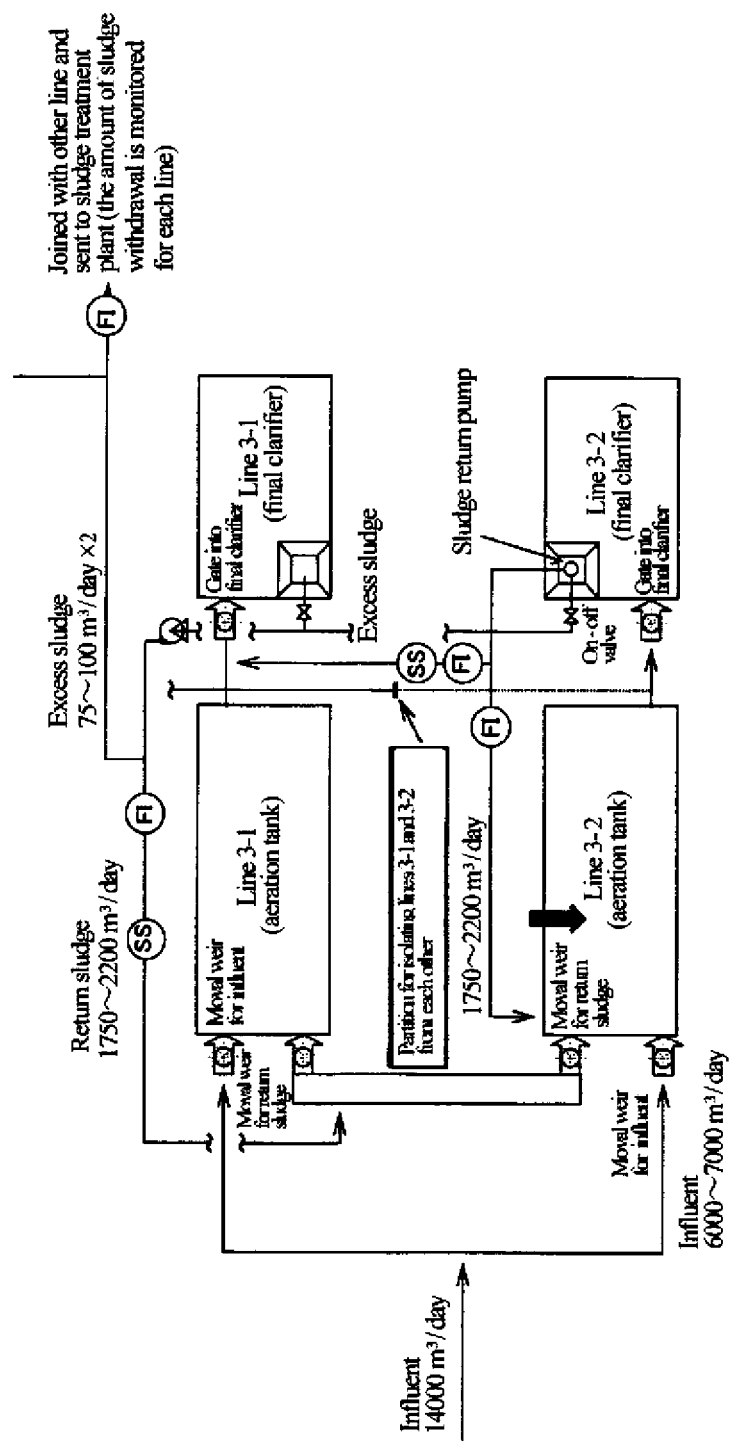
FIG. 1 is a diagram showing the system for treating raw water influent into the sewage treatment plant used in Example 1.

The method of reducing excess sludge product in a bioreactor and the activated sludge materials according to the invention will be described.

The bioreactor to which the sludge reduction method of the invention is applied may be of any type of wastewater treatment plants utilizing organisms, such as a combined business wastewater treatment system, wastewater treatment facilities in marine product processing plants, food plants, or meat processing plants, livestock farm effluent treatment facilities, agricultural community effluent treatment facilities, and domestic wastewater treatment facilities.

The activated sludge material to be added to a bioreactor according to the invention has a chitinase specific activity of at least 150 Units/g-MLSS, preferably 150 to 1500 Units/g-MLSS, more preferably 500 to 1500 Units/g-MLSS, and a pectinase specific activity of at least 120 Units/g-MLSS, preferably 120 to 1200 Units/g-MLSS, more preferably 500 to 1200 Units/g-MLSS.

When in using an activated sludge material having a chitinase specific activity less than 150 Units/g-MLSS or a pectinase specific activity less than 120 Units/g-MLSS, it often takes much time until manifestation of the sludge production reducing effect. In some cases, no sludge reducing effect is shown.

It is preferred that the activated sludge material of the invention have a protease specific activity of at least 3 U/g-MLSS, more preferably 3 to 150 Units/g-MLSS, even more preferably 20 to 150 Units/g-MLSS, and/or a cellulase activity of at least 100 Units/L, more preferably 100 to 1500 Units/L.

When an activated sludge material is added to a targeted bioreactor to start operation with reduced sludge production, the amount of the activated sludge material to be added is preferably 0.1% to 10% by mass, more preferably 1% to 10% by mass, based on the sludge present in the bioreactor. When this amount is less than 0.1% by mass of the sludge in the bioreactor, the absolute amount of enzymes produced is reduced so that the activated sludge material has slow onset of action, sometimes failing to perform the action. Addition of more than 10% by mass of the activated sludge material entails increased maintenance cost, resulting in considerably reducing profitability of the activated sludge material, which can make the method unfeasible.

The manner of adding the activated sludge material to a bioreactor is not limited. For example, the whole amount of the activated sludge material may be added all at once to the bioreactor or in portions at interval. The activated sludge material may be once placed in a reservoir, in which part of the sludge withdrawn from the bioreactor is put and mixed, and the mixture is slowly added to the bioreactor.

The sludge reduction method of the invention works as long as the wastewater treatment in the bioreactor is carried out under ordinary conditions. Practicing the sludge reduction method of the invention does not need adjusting the temperature, pH, and like conditions of the bioreactor.

The activated sludge in a bioreactor of an ordinary wastewater treatment plant (i.e., before addition of the activated sludge material of the invention) has low enzyme specific activities, such as a chitinase specific activity of about 6 to 16 Units/g-MLSS, a pectinase specific activity of about 6 to 20 Units/g-MLSS, a protease specific activity of about 0.1 Units/g-MLSS, a cellulase specific activity of about 15 to 20 Units/g-MLSS, and an amylase specific activity of about 10 to 20 Units/g-MLSS. The activated sludge material of the invention is characterized by having per se markedly high enzyme specific activities and, when added to a bioreactor of a wastewater treatment plant, being capable of largely changing the enzyme specific activities inherent to the bioreactor.

An effluent from an ordinary wastewater treatment plant using organisms generally has a chitinase activity of about 15 to 30 Units/L and a pectinase activity of about 10 to 25 Units/L. The effluent from a wastewater treatment system using the activated sludge material of the invention is unique in having a chitinase activity of 50 Units/L or higher and a pectinase activity of 50 Units/L or higher.

In the invention, the enzyme specific activity is obtained by dividing an enzyme activity determined by the following enzyme activity assay by a solids content (g/L) of a sample.

Enzyme Activity Assay:

A sample (sludge in a bioreactor or activated sludge material) is centrifuged to collect the supernatant. Each of the substrates listed below is suspended in a 0.1 M tris-HCl buffer solution (pH 7.0) in a concentration of 20 g/L. To 0.5 ml of the suspension are added 0.25 ml of the 0.1M tris-HCl buffer solution and 0.25 ml of the supernatant, and the system was incubated at 37° C. for 24 hours. Each enzyme activity (one unit per liter) equals one micromole of product produced by the decomposition of the substrate per minute.

Substrate:
  Colloidal chitosan for chitinase activity
  Apple pectin for pectinase activity
  Alpha-casein for protease activity
  Avicel (a trade name of microcrystalline cellulose, a standardized product) for cellulase activity
  Soluble starch or raw starch for amylase activity The method of controlling a bioreactor according to the invention will then be described.

The bioreactor to which the control method of the invention is applied may be of any type of wastewater treatment plants utilizing organisms, such as those described supra with respect to the method of sludge reduction.

The activated sludge material that is added to the bioreactor according to the control method is the activated sludge material used in the aforementioned sludge reduction method of the invention. It is particularly preferred for the activated sludge material to be added to the bioreactor to have a chitinase specific activity of at least 150 Units/g-MLSS, preferably 150 to 1500 Units/g-MLSS, more preferably 500 to 1500 Units/g-MLSS, a pectinase specific activity of at least 120 Units/g-MLSS, preferably 120 to 1200 Units/g-MLSS, more preferably 500 to 1200 Units/g-MLSS, and a protease specific activity of at least 3 Units/g-MLSS, preferably 3 to 150 Units/g-MLSS, more preferably 20 to 150 Units/g-MLSS.

When in using an activated sludge material having a chitinase specific activity less than 150 Units/g-MLSS or a pectinase specific activity less than 120 Units/g-MLSS, or a protease specific activity less than 3 Units/g-MLSS, it often takes much time until manifestation of the sludge reducing effect. In some cases, no sludge reducing effect is shown.

It is also preferred for the activated sludge material to have a cellulase activity of at least 100 Units/L, more preferably 150 to 500 Units/L.

The activated sludge material is added to the bioreactor when any one of the chitinase activity, pectinase activity, and protease activity of the sludge in the bioreactor drops below the following respective lower limits:
Chitinase activity of 50 Units/L, preferably 60 Units/L.
Pectinase activity of 40 Units/L, preferably 50 Units/L.
Protease activity of 0.3 Units/L, preferably 0.5 Units/L.

The lower limit of each enzyme activity is preferably decided according to, for example, the conditions of the sludge in the bioreactor to be controlled. A generally recommended lower limit value of each enzyme is in the range of from about 40% to about 65% of the maximum specific activity. As used herein, the term "maximum specific activity" means the maximum specific activity reached by the enzyme in a bioreactor after adding the activated sludge material to the bioreactor.

It is preferred that the activated sludge material of the invention be first added to a bioreactor to which the control method of the invention is applied in an amount of 0.1% to 10% by mass based on the sludge present in the bioreactor and, then, when any one of the chitinase activity, the pectinase activity, and the protease activity of the sludge in the bioreactor drops below the respective limits recited above, the activated sludge material is added to the bioreactor in an amount of 0.05% by mass or more, more preferably 0.1% by mass or more, based on the mass of the sludge in the bioreactor. When additional amount of activated sludge material is less than 0.05% by mass based on the sludge in the bioreactor, the absolute amount of enzymes produced is reduced so that the activated sludge material has slow onset of action, sometimes failing to perform the action. The additional amount of more than 1% by mass entails increased maintenance, resulting in considerably reducing profitability of the activated sludge material.

The manner of adding the activated sludge material to a bioreactor is not limited. For example, the whole amount of the activated sludge material may be added all at once to the bioreactor or in portions at interval. The activated sludge material may be once placed in a reservoir, in which part of the sludge withdrawn from the bioreactor is put and mixed, and the mixture is slowly added to the bioreactor.

The control method of the invention works as long as the biological wastewater treatment in the bioreactor is carried out under common conditions. Practicing the control method of the invention does not need adjusting the temperature, pH, and like conditions of the bioreactor.

EXAMPLES

The invention will now be illustrated in greater detail with reference to Examples, but it should be understood that the invention is not deemed to be limited thereto.

Example 1

Example 1 illustrates application of the invention to the bioreactor of a sewage treatment plant. As illustrated in FIG. 1, raw water influent into the sewage treatment plant was divided into nearly equal two portions. One half was introduced into a bioreactor (line 3-2, test line) to which an activated sludge material of the invention was to be added, and the other half was sent to an ordinary bioreactor (line 3-1, control line).

The activated sludge material used had a chitinase specific activity of 161.2 Units/g-MLSS, a pectinase specific activity of 121.3 Units/g-MLSS, a protease specific activity of 3.1 Units/g-MLSS, a cellulase specific activity of 15.1 Units/g-MLSS, and an amylase specific activity of 10.2 Units/g-MLSS. The activated sludge material was added to an aeration tank of the bioreactor of the test line (on May 21, 2007) in an amount of 0.6 vol % based on the quantity of the influent fed into the aeration tank and of 10 mass % based on the mass of the sludge in the bioreactor (test line).

The activities of the enzymes of the sludge in the bioreactor (test line) were determined before the addition of the activated sludge material and after two months from the addition (on Jul. 23, 2007). For comparison, the activities of the enzymes of the sludge in the bioreactor where no activated sludge was added (control line) were determined on the same days as the test line. The results obtained are shown in Tables 1 through 3.

As is apparent from the results in Tables 1 to 3, it is seen that the enzymes of the sludge in the bioreactor (test line) after two months from the addition of the activated sludge material retain the enzyme pattern of the activated sludge material added.

TABLE 1

Before Addition of Activated Sludge Material

| | Unit | Chitinase | Pectinase | Protease | Cellulase | Amylase |
|---|---|---|---|---|---|---|
| Test Line | U/L | 8 | 8 | 0.13 | 14 | 21 |
| Control Line | U/L | 3 | 4 | 0.1 | 7 | 18 |
| Test Line | U/g | 5.5 | 5.5 | 0.1 | 9.6 | 14.4 |
| Control Line | U/g | 2.2 | 2.9 | 0.07 | 5.2 | 13.2 |
| Effluent (test line) | U/L | 5 | 7 | 0.11 | 8 | 12 |
| Effluent (control line) | U/L | 2 | 3 | 0.1 | 5 | 9 |

"U" stands for "Unit",
"g" stands for "g-MLSS".

TABLE 2

Properties of Activated Sludge Material Added

| | Unit | Chitinase | Pectinase | Protease | Cellulase | Amylase |
|---|---|---|---|---|---|---|
| Activated Sludge Material | U/L | 2645 | 1989 | 50 | 248 | 168 |
| | U/g | 161.2 | 121.3 | 3.1 | 15.1 | 10.2 |

TABLE 3

After 2 Months from Addition of Activated Sludge Material

| | Unit | Chitinase | Pectinase | Protease | Cellulase | Amylase |
|---|---|---|---|---|---|---|
| Test Line | U/L | 68 | 70 | 0.46 | 54 | 63 |
| Control Line | U/L | 21 | 32 | 0.18 | 28 | 32 |
| Test Line | U/g | 42 | 43 | 0.28 | 33.1 | 38.7 |
| Control Line | U/g | 12.7 | 19 | 0.11 | 16.9 | 19.4 |
| Effluent (test line) | U/L | 54 | 52 | 0.4 | 42 | 45 |
| Effluent (control line) | U/L | 20 | 24 | 0.13 | 25 | 25 |

The amount of excess sludge produced in the bioreactor of each of the test line and the control line was continuously monitored for a period from one month before addition of the activated sludge material until 12 months after the addition and acclimation. The results obtained are graphically shown in FIGS. 2 and 3.

Figure 2:
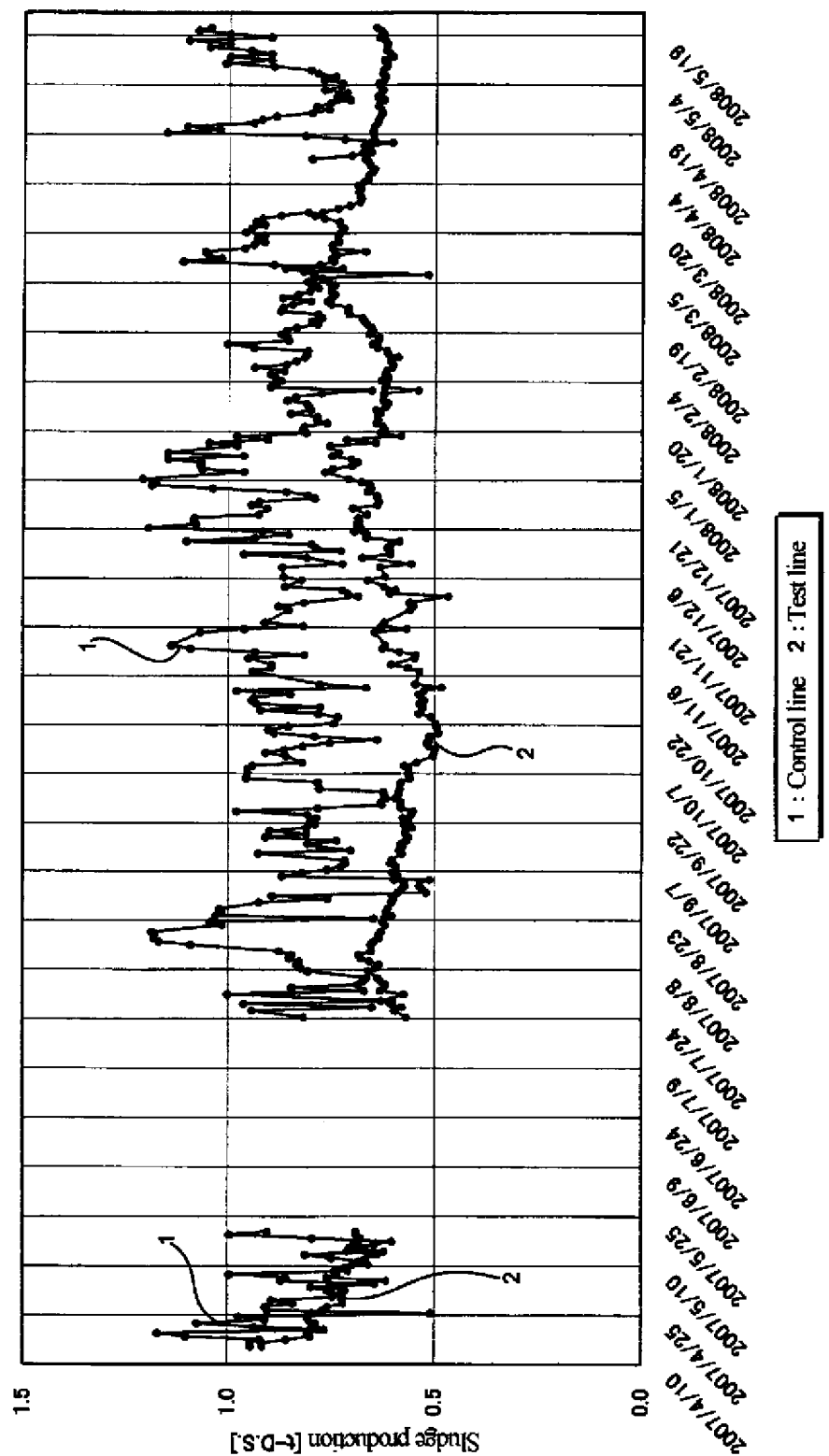
FIG. 2 is a graph showing the results of comparison of excess sludge production in terms of change in dry mass of the sludge withdrawn from the bioreactor of Example 1 which was continuously monitored for a period from one month before addition of an activated sludge material until 12 months after the addition and acclimation.
Figure 3:
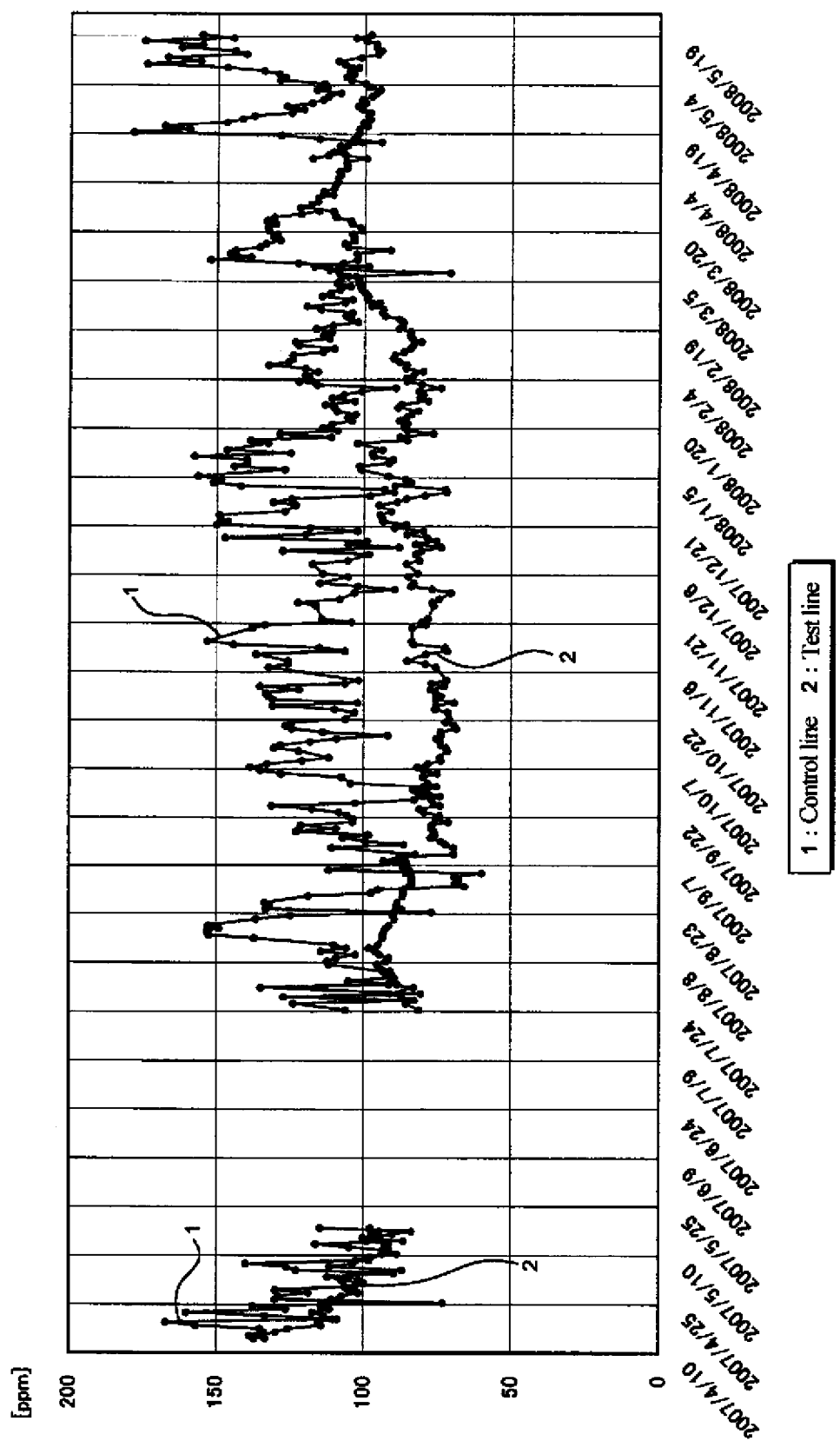
FIG. 3 is a graph showing the results of comparison of excess sludge production in terms of change in rate of sludge production (the amount of sludge withdrawn divided by the amount of influent introduced into the bioreactor) in Example 1 which was continuously monitored for a period from one month before addition of an activated sludge material until 12 months after the addition and acclimation.

It is seen from FIGS. 2 and 3 that the sludge production in the test line fluctuates at lower levels than in the control line. The excess sludge production suppressing effect by the addition of the activated sludge material of the invention has thus been confirmed.

It is seen from the results in FIGS. 2 and 3 that the onset of the excess sludge production reducing effect is 4 months after the addition of the activated sludge material (September, 2007) and that the duration of the effect is 7 months during which a 20% to 40% by mass reduction is achieved.

The reducing effect on excess sludge production tended to be lessened from 8 to 9 months after the first addition of the activated sludge material to the bioreactor (January to February, 2008). The enzyme activities of the sludge in the bioreactor (test line) assayed at this stage are shown in Table 4. As shown, the chitinase activity was 38 Units/L, which is below the lower limit of 50 Units/L; the pectinase activity was 30 Units/L, which is below the lower limit of 40 Units/L; and the protease activity was 0.19 Units/L, which is below the lower limit of 0.3 Units/L. At the end of February, 2008, i.e., after 9 months from the first addition of the activated sludge material, another activated sludge material was added in an amount of 0.07% by mass based on the mass of the sludge in the bioreactor. The activated sludge material used this time (second addition) had a chitinase specific activity of 184.5 Units/g-MLSS, a pectinase specific activity of 135.7 Units/g-MLSS, and a protease specific activity of 5.1 Units/g-MLSS. As a result, the enzyme activities were recovered above the respective lower limits after 2 months from the second addition as shown in Table 4. It is also apparent from FIGS. 2 and 3 that the reducing effect on excess sludge production was recovered to attain a 20% to 25% reduction.

TABLE 4

| | Unit | Chitinase | Pectinase | Protease | Cellulase | Amylase |
|---|---|---|---|---|---|---|
| Sludge of Bioreactor after 2 Months | U/L | 92 | 89 | 0.53 | 72 | 90 |
| Sludge of Bioreactor after 7 Months | U/L | 65 | 47.5 | 0.27 | 37 | 56 |
| Sludge of Bioreactor after 8-9 Months | U/L | 38 | 30 | 0.19 | 25 | 35 |
| Activated Sludge Material of 2nd Addition | U/g U/L | 184.5 | 135.7 | 5.1 | 13.5 245 | 10.1 184 |
| Sludge of Bioreactor after 2 Months from 2nd Addition | U/L | 52.5 | 41.5 | 0.36 | 32 | 47 |

INDUSTRIAL APPLICABILITY

The method for reducing sludge production of the invention has high suppressive effect on sludge production in a bioreactor of a wastewater treatment plant using organisms and is introducible into an existing wastewater treatment plant at low cost.

The method for controlling a bioreactor of a wastewater treatment plant using organisms of the invention exhibits high suppressive effect on sludge production in the bioreactor with minimum production of excess sludge and is introducible into an existing wastewater treatment plant at low cost.

For instance, while an existing wastewater treatment plant that receives 14000 m$^3$/day of an influent produces about 1.5 ton/day of excess sludge on a dry basis, introduction of the sludge reduction method and the control method of the invention to the plant achieves reduction of the excess sludge production to about 0.8 ton/day on a dry basis (equal to a reduction of about 0.7 ton/day, which amounts to about 250 ton per year). Considering that treatment of one ton of excess sludge is said to emit 0.5 ton of carbon dioxide, the invention is enormously beneficial as well to meet the challenge of $CO_2$ emission reduction.

The invention claimed is:

1. An activated sludge material having a chitinase specific activity of 150 to 1500 Units/g-MLSS and a pectinase specific activity of at least 120 to 1200 Units/g-MLSS.

2. The activated sludge material according to claim 1, having a protease specific activity of at least 3 to 150 Units/g-MLSS.

3. A method for reducing excess sludge production in a bioreactor of a wastewater treatment plant in which excess sludge is being produced, the method comprising adding the activated sludge material according to claim 1 to the bioreactor.

4. The method for reducing excess sludge production according to claim 3, wherein the amount of the activated sludge material to be added is 0.1% to 10% by mass based on the mass of the sludge in the bioreactor.

5. A method for controlling a bioreactor of a wastewater treatment plant using organisms, the method comprising adding the activated sludge material according to claim 1 to the bioreactor at the time when any one of the chitinase activity, the pectinase activity, and the protease activity of the activated sludge in the bioreactor drops below the following respective lower limits: a chitinase activity of 50 Units/L; a pectinase activity of 40 Units/L; and a protease activity of 0.3 Units/L.

6. The method for controlling according to claim 5, wherein the amount of the activated sludge material to be added is 0.05% by mass or more based on the mass of the sludge in the bioreactor.

7. A method for controlling a bioreactor of a wastewater treatment plant using organisms, the method comprising adding the activated sludge material according to claim 1 to the bioreactor at the time when any one of the chitinase activity, the pectinase activity, and the protease activity of the activated sludge in the bioreactor drops below the following respective lower limits: a chitinase activity of 50 Units/L; a pectinase activity of 40 Units/L; and a protease activity of 0.3 Units/L, wherein the activated sludge material is the activated sludge material according to claim 1, having a protease specific activity of at least 3 to 150 Units/g-MLSS.

8. A method for reducing excess sludge production in a bioreactor of a wastewater treatment plant in which excess sludge is being produced, the method comprising adding the activated sludge material according to claim 2 to the bioreactor.

9. A method for controlling a bioreactor of a wastewater treatment plant using organisms, the method comprising adding the activated sludge material according to claim 2 to the bioreactor at the time when any one of the chitinase activity, the pectinase activity, and the protease activity of the activated sludge in the bioreactor drops below the following respective lower limits: a chitinase activity of 50 Units/L; a pectinase activity of 40 Units/L; and a protease activity of 0.3 Units/L.

* * * * *